US012613521B2

(12) United States Patent　　　(10) Patent No.:　US 12,613,521 B2

Kontaxakis　　　　　　　　　　　　(45) Date of Patent:　Apr. 28, 2026

(54) SYSTEM AND METHOD FOR CONTROLLING A MOBILE INDUSTRIAL ROBOT USING A PROBABILISTIC OCCUPANCY GRID

(71) Applicant: ABB Schweiz AG, Baden (CH)

(72) Inventor: Polychronis Kontaxakis, Västerås (SE)

(73) Assignee: ABB Schweiz AG, Baden (CH)

( * ) Notice: Subject to any disclaimer, the term of this patent is extended or adjusted under 35 U.S.C. 154(b) by 521 days.

(21) Appl. No.: 18/246,066

(22) PCT Filed: Sep. 25, 2020

(86) PCT No.: PCT/EP2020/076970

§ 371 (c)(1),
(2) Date: Mar. 21, 2023

(87) PCT Pub. No.: WO2022/063412

PCT Pub. Date: Mar. 31, 2022

(65) Prior Publication Data

US 2023/0367321 A1　　Nov. 16, 2023

(51) Int. Cl.
*G05D 1/00*　　　(2024.01)
*B25J 5/00*　　　(2006.01)

(52) U.S. Cl.
CPC .............. *G05D 1/0214* (2013.01); *B25J 5/00* (2013.01); *G05D 1/0088* (2013.01)

(58) Field of Classification Search
CPC .. G05D 1/0214; G05D 1/0088; G05D 1/0274; G05D 1/0248; B25J 5/00;

(Continued)

(56) References Cited

U.S. PATENT DOCUMENTS

2009/0018712 A1 * 1/2009 Duncan ................ G09B 19/167
　　　　　　　　　　　　　　　　　　　　　701/2
2016/0086050 A1 3/2016 Piekniewski et al.

(Continued)

OTHER PUBLICATIONS

Munoz-Salinas, Rafael; et al.; "A Bayesian plan-view map based approach for multiple-person detection and tracking"; Pattern Recognition, vol. 41, Issue 12; Elsevier, GB; Dec. 1, 2008; 12 Pages.

(Continued)

*Primary Examiner* — Nhi Q Bui

(74) *Attorney, Agent, or Firm* — Whitmyer IP Group LLC

(57) ABSTRACT

A robot movable on a substrate is controlled on the basis of an occupancy grid of cells, where each cell is associated with an occupancy probability that some physical object is present in the cell. From an elevation map and a chromaticity map, an occupancy probability may be assigned as follows: a first partial occupancy probability $p_1$ is derived from a mean elevation of each cell; a distribution of the chromaticity is estimated and dominant chromaticity values are identified; a rule is applied that assigns a lower second partial occupancy probability $p_2$ to a cell when the chromaticity of the cell if its chromaticity is one of dominant chromaticity values in the chromaticity map; and the occupancy probability is obtained by merging the first and second partial occupancy probabilities.

14 Claims, 4 Drawing Sheets

(58) Field of Classification Search
CPC .. G01C 21/206; G06V 2201/06; G06V 10/56;
G06V 20/56
See application file for complete search history.

(56) References Cited

U.S. PATENT DOCUMENTS

| | | | | |
|---|---|---|---|---|
| 2019/0080463 | A1 * | 3/2019 | Davison | ............... G05D 1/0253 |
| 2021/0356972 | A1 * | 11/2021 | Kwon | .................... G05D 1/246 |

OTHER PUBLICATIONS

Liu, Ziyuan, et al; "A Coherent Semantic Mapping System Based on Parametric Environment Abstraction and 3D Object Localization"; 2013 European Conference on Mobile Robots (EMCR), IEEE; Barcelona, Spain; Sep. 25, 2013; 6 Pages.
Kondaxakis, Polychronis, et al; "Robot-Robot Gesturing for Anchoring Representations", IEEE Transactions on Robotics, IEEE Service Center, vol. 35, No. 1.; Feb. 1, 2019; 15 Pages.
International Search Report and Written Opinion of the International Searching Authority; Application No. PCT/EP2020/076970; Completed: Jun. 7, 2021; Mailing Date: Jun. 16, 2021; 15 Pages.
Robbiano, Christopher; et al.; "Bayesian Learning of Occupancy Grids"; IEEE Transactions on Intelligent Transportation Systems, vol. 23, No. 2; Feb. 2022; 11 Pages.
The Point Cloud Library; https://pointclouds.org/; Accessed on Mar. 20, 2023; 1 Page.

\* cited by examiner

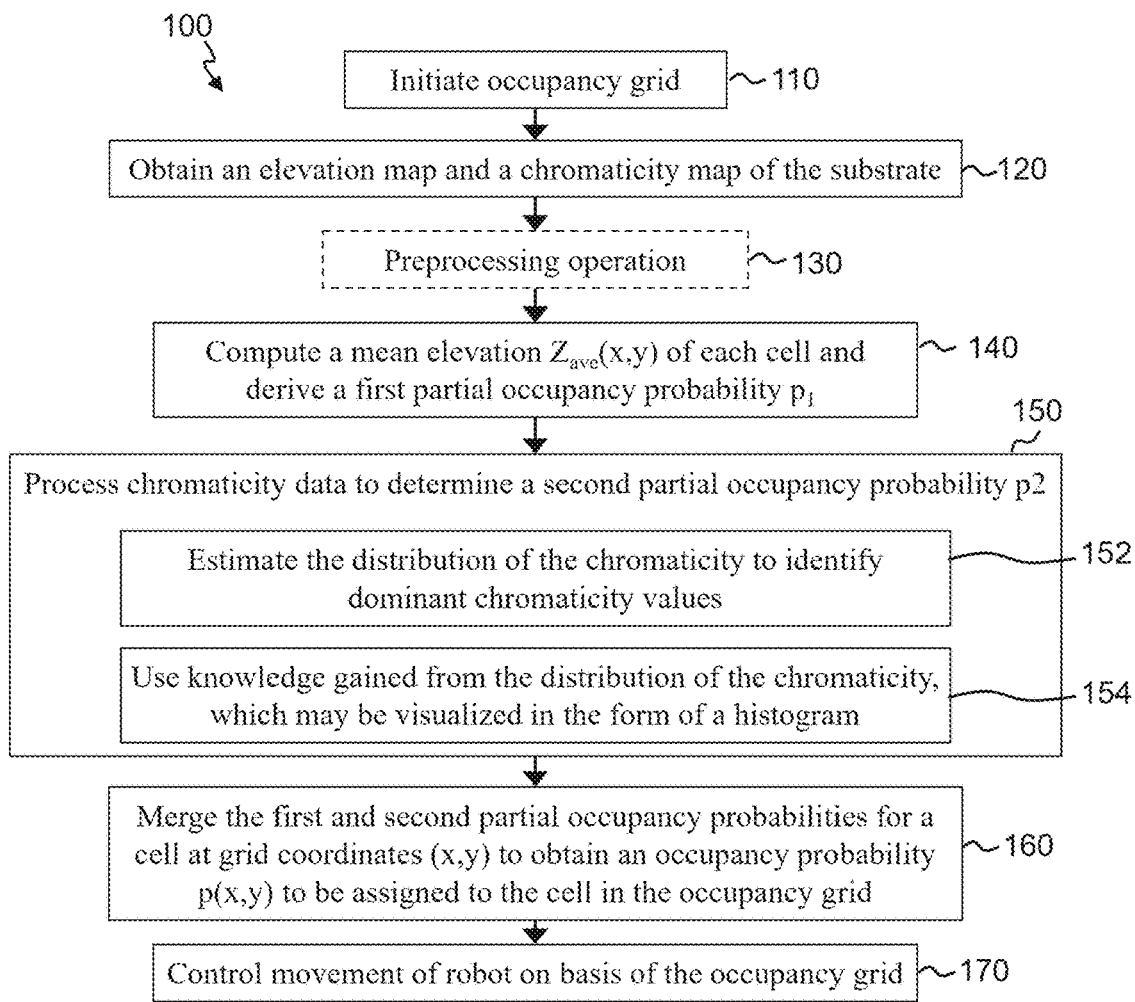

100

| Initiate occupancy grid |~110

| Obtain an elevation map and a chromaticity map of the substrate |~120

| Preprocessing operation |~130

| Compute a mean elevation $Z_{ave}(x,y)$ of each cell and derive a first partial occupancy probability $p_1$ |~140

150

Process chromaticity data to determine a second partial occupancy probability p2

| Estimate the distribution of the chromaticity to identify dominant chromaticity values |~152

| Use knowledge gained from the distribution of the chromaticity, which may be visualized in the form of a histogram |~154

| Merge the first and second partial occupancy probabilities for a cell at grid coordinates (x,y) to obtain an occupancy probability $p(x,y)$ to be assigned to the cell in the occupancy grid |~160

| Control movement of robot on basis of the occupancy grid |~170

Fig. 1

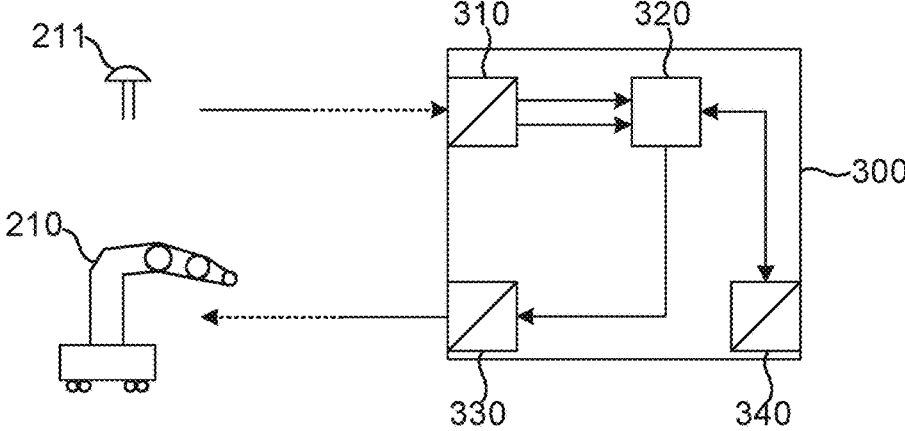

SYSTEM AND METHOD FOR CONTROLLING A MOBILE INDUSTRIAL ROBOT USING A PROBABILISTIC OCCUPANCY GRID

TECHNICAL FIELD

The present disclosure relates to the field of robot navigation and, in particular, to methods and devices for controlling a mobile industrial robot on the basis of a probabilistic occupancy grid representing a substrate on which the robot can move.

BACKGROUND

Significant research has been and is being devoted to the problem of developing perception mechanisms for supporting control systems in mobile industrial robots. A satisfactory perception mechanism should enable the robot to navigate constrained and populated environments efficiently, while at the same time avoiding destructive collisions. Objects mixed with other objects of different heights, objects with small dimensions, transparent or reflective objects, dark or black objects are all known to cause difficulties to perception mechanisms attempting to discover and correctly assess them.

So-called occupancy grids, or probability maps, are frequently used tools for modeling the navigable environment of a mobile robot. The cells of the occupancy grid are initialized with neutral probability values, which are subsequently refined based on acquired sensor data. The problem of updating such a probability map based on a sequence of sensor measurements made from a moving platform is discussed in a preprint by Chr. Robbiano et al., "Bayesian Learning of Occupancy Grids", retrieved from arxiv.org/abs/1911.07915.

Particularly addressing an indoor mobile robot application where the navigable environment is modeled by a two-dimensional occupancy grid, the present disclosure aims to improve the prior art techniques.

SUMMARY

One objective is to make available methods and devices for providing an occupancy grid to support the controlling of a mobile industrial robot. Another objective is to enable maintenance and successive refinement of such occupancy grid on the basis of continuing measurements by a color-depth sensor, notably a robot-mounted color-depth sensor. A particular objective is to propose efficient data processing techniques suited for use cases where RGB-D (red-green-blue plus depth, i.e., color image and depth map) measurements are available.

These and other objectives are achieved by the method and the robot controller according to the invention defined by the independent claims. The dependent claims are directed to embodiments of the invention.

In a first aspect, a method of controlling an industrial robot movable on a substrate comprises: initializing an occupancy grid of cells which each represents a portion of the substrate and is associated with an occupancy probability that some physical object is present in the cell; and obtaining an elevation map and chromaticity map of the substrate. On the basis of the elevation map, a mean elevation of each cell is computed, and a first partial occupancy probability is derived from the mean elevation, in such manner that a higher first partial occupancy probability corresponds to a greater mean elevation. On the basis of the chromaticity map, a distribution of the chromaticity is estimated, and dominant values are identified, and a second occupancy probability is computed on the basis of a cell-wise chromaticity, in such manner that the computation assigns a lower second partial occupancy probability if the chromaticity of the cell is one of the dominant chromaticity values. The first and second partial probabilities are merged for each cell and the result constitutes an occupancy probability which is assigned to the cell in the occupancy grid. The occupancy grid thus provided may be used as a basis for controlling the industrial robot.

The inventor has realized that, to judge whether a cell is free or occupied, it is expedient to identify globally dominant chromaticity values and search for cells in which, concurrently, the chromaticity value of the cell belongs to the globally dominant ones and the elevation value is comparatively small. A criterion based on this combination is therefore a useful tool for building an algorithm that converges in reasonable time, produces a highly accurate occupancy grid, or both. As a result, the potential productive clock time that the robot spends waiting for a fresh occupancy grid to be generated (or for an update of an existing occupancy grid) is reduced. Likewise, robot navigation may become safer and more precise.

In a second aspect, there is provided a robot controller for controlling at least one mobile industrial robot. The robot controller comprises an input interface, processing circuitry and output interface and it is configured to perform the above method.

The invention further relates to a computer program containing instructions for causing a computer, or the robot controller in particular, to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storages of magnetic, optical, or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which:

FIG. 1 is a flowchart of a method according to an embodiment;

FIG. 3 is a block diagram of a robot controller according to an embodiment;

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, the embodiments are provided by way of example so that this disclosure will be thorough and complete, and to fully convey the scope of all aspects of invention to those skilled in the art. Like numbers refer to like elements throughout the description.

Figure 2:
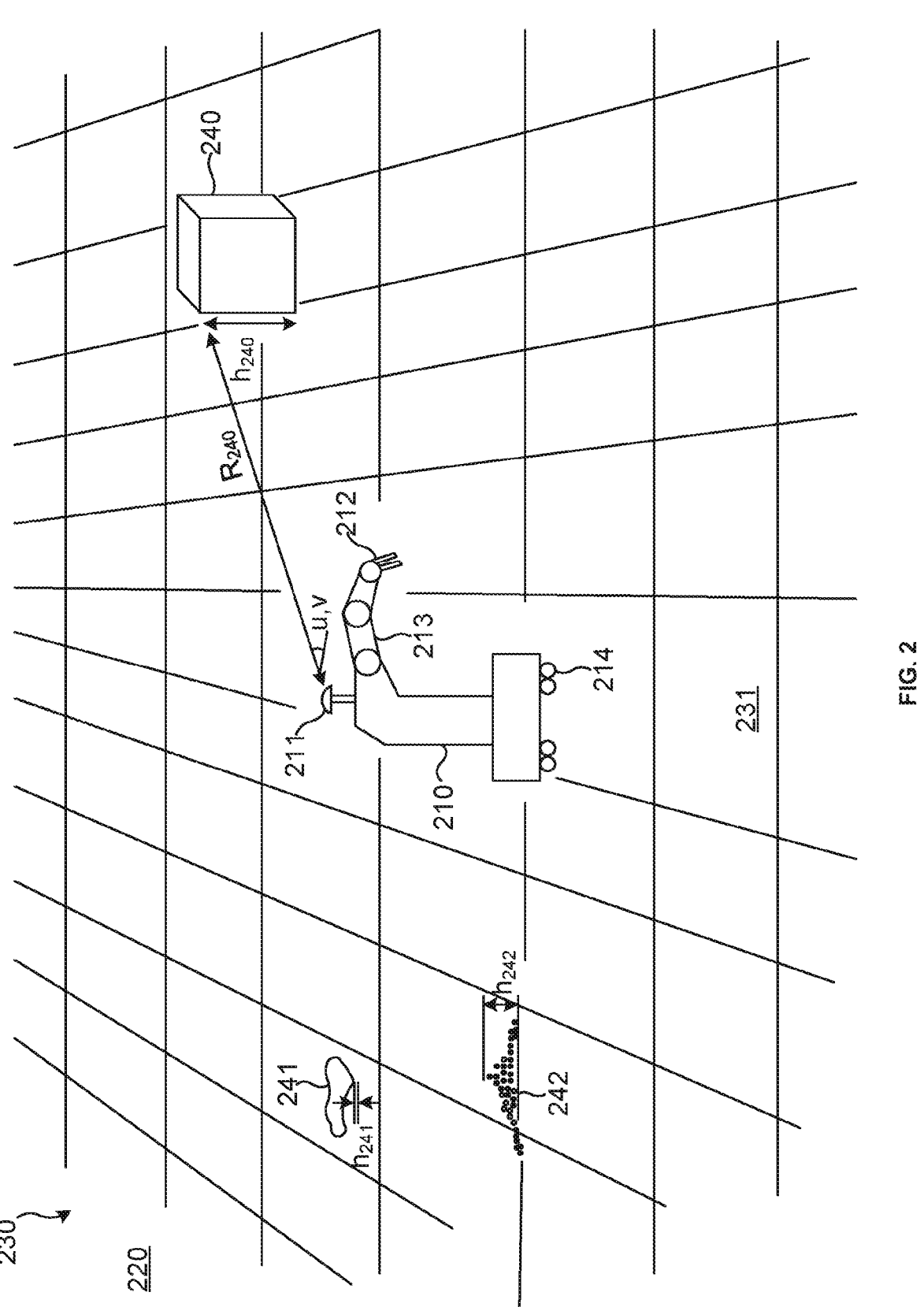
FIG. 2 is a perspective view of an industrial robot adapted to move on a substrate, modeled as a two-dimensional occupancy grid, and objects thereon representing potential obstacles to the robot's movement.

FIG. 2 depicts a setting where the present invention may be applied. Here, an industrial robot 210 is movable over a substrate 220 by means of wheels 214, bands, claws, movable suction cups or other means of propulsion and/or attachment. The substrate 220 may be a planar or curved surface with a horizontal, slanted, or vertical orientation; it may optionally be provided with rails or other movement guides adapted to cooperate with the robot 210. Example substrates 220 include an indoor floor, outdoor ground, a surface preconditioned to facilitate driving etc. Present are furthermore physical objects which may act as obstacles of different seriousness to the robot's 210 movement over the substrate 220. To exemplify, FIG. 2 shows a box-shaped object 240 comparable to the robot's 210 height, a puddle of liquid 241 and a moderately sized heap of powdery material 242. From these, the puddle of liquid 241 will normally not impede the robot's 210 movement, and it is therefore an aim that it be treated as a non-obstacle that the algorithm to be described below.

The bookkeeping of obstacles relies on an occupancy grid 230, a data structure which associates each of the multiple cells 231 of the grid with an occupancy probability p. An occupancy probability of a cell at grid indices (x,y) may be denoted p(x,y). The resolution of the grid may be expressed as a cell size parameter tyres, which may be of the order of 0.01 m to 1 m, such as 0.05 m, 0.10 m or 0.20 m. For navigation of relatively slower-moving and sensitive robots 210, a smaller cell size is preferable. In the present disclosure, unless otherwise indicated, grid indices (x,y) refer to the discretized grid at resolution $w_{res}$. The grid indices may for example be represented as integer pairs, and real-valued cartesian coordinates (X,Y,Z) (which may have been read from a sensor) may be converted into grid indices (x,y) by orthogonal projection on the Z=0 plane (corresponding to the substrate 220) combined with a rounding operation. The fact that grid indices (x,y) correspond to converted coordinates (X,Y,Z) may be written (X,Y,Z)~(x,y), it is noted that this is a rank-deficient operation which is in general not invertible. The grid indices may optionally be extended with a height index z into an integer triplet (x,y,z), each triplet referring to a cubic grid cell (voxel). In this disclosure, uppercase letters are preferred for coordinates and lowercase letters for grid and height indices.

The present disclosure will rely on ordinary terminology and the commonly embraced theoretical basics of occupancy grids. In particular, an occupancy probability of a cell may be understood as the posterior probability that a physical object is present in the cell. The highest likelihood that a physical object is present corresponds to the value p=1. Cells with occupancy probability values in the range (0.5,1.0] may be treated as occupied cells, and cells with values in [0.0,0.5) may be taken to be free. The left-out value 0.5 represents an unknown occupancy status. The occupancy grid 230 is a probabilistic representation that goes beyond the binary distinction occupied/free and thereby enables sensor fusion and the nuanced combining of multiple measurements by a single sensor. In some embodiments, an alternative occupancy grid is used where each cell is associated with a probability (a 'non-occupancy probability') p' that the cell is free, i.e., no physical object is present. This means that the highest likelihood that a physical object is present corresponds to the value p'=0.

The robot 210 is shown equipped with a movable arm 213, end effector 212 and sensor 211. The sensor may be elevated, i.e., located some distance $Z_a$ above the level of the substrate 220 to make efficient use of its field of view. The sensor 211 may be configured to employ at least one measuring principle that includes sensing an incident electromagnetic wave reflected or emitted by the objects 240, 241, 242 on the substrate 230 or the substrate 230 itself. To exemplify, an incident ray from the box 240 is shown in FIG. 2. In particular, the sensor 211 has the ability of providing an elevation map and a chromaticity map of the substrate 220 and any physical objects present on the substrate 220. For instance, an RGB-D sensor may produce a two-dimensional color bitmap, where at least some pixels are annotated with depth values, representing an image plane orthogonal to the orientation of the angle of incidence S. Such depth-annotated pixels may be converted into a point cloud, where each point is represented in three-dimensional coordinates (e.g., cartesian, spherical, radial) and additionally carries a color or chromaticity value. Alternatively, the RGB-D sensor may produce a point cloud directly. Libraries with generically applicable software routines for analyzing point-cloud data and performing operations thereon are available, e.g., from The Point Cloud Library (https://pointclouds.org).

FIG. 3 is a schematic representation of a robot controller 300 suitable for controlling the robot 210 of FIG. 2. The robot controller 300 may be integral with the robot 210 or may be implemented as a separate, stationary, or mobile unit. It comprises an input interface 310 configured to receive occupancy-related measurements obtained by the sensor 211 on the robot, processing circuitry 320 configured to assign an occupancy probability on the basis of the received occupancy-related measurements, an output interface 330 for supplying commands to the robot 210, as well as an operator interface 340. The interfaces 320, 340 and processing circuitry 320 may be local resources or networked (or cloud) resources; in particular, the processing circuitry 320 may include one processor or multiple processors. The operator interface 340 may be a text-based, graphical, auditory and/or haptic interface, by which the robot controller 300 may receive instructions directing on high level the commands to be fed to the robot 210, and by which it may output human-intelligible information indicative of a state or condition of the robot 210. FIG. 3 furthermore indicates an example set of communicative connections (data connections) among the internal functional components 310, 320, 330, 340 of the robot controller 300. Alternatively, the connections may be implemented as a central bus providing multipoint connectivity.

To establish and maintain the occupancy grid, the robot controller 300 may perform the method 100 depicted in FIG. 1.

In a first step 110, the occupancy grid is initiated. It may take into account the geometry of the substrate 220 and a configured value of the cell size $w_{res}$. The initiation may further include assigning a neutral occupancy probability (e.g., p=0.5, corresponding to an unknown occupancy state) to all cells 231 of the occupancy grid 230. Alternatively, a specific placeholder value may be assigned, so as to signify that the occupancy probability has not yet been updated in view of an occupancy-related measurement.

In a second step 120, an elevation map and a chromaticity map of the substrate 220 are obtained.

As used herein, an elevation map associates each point of the substrate 220 with a value of the elevation (or height) above a reference level $Z=Z_{min}$. The reference level may coincide with the substrate 220 or may be a dedicated reference plane; the latter option may simplify calculations in cases where the substrate 220 is curved. The resolution of the elevation map may be one value per cell 231 of the occupancy grid 230 or a finer resolution; the elevation value may be continuous or discretized in agreement with the grid resolution $w_{res}$. In the example illustrated in FIG. 2, the physical objects 240, 241, 242 have respective elevations $h_{240}$, $h_{241}$, $h_{242}$.

A chromaticity map associates points of the substrate 220 with respective chromaticity values. Similar to the elevation map, it is sufficient for the chromaticity map to have one chromaticity value per cell 231 of the occupancy grid 230. The chromaticity may refer to any suitable color model, such as RGB, HSL, HSV, Munsell, NCS and the like. For purposes of illustration and not limitation, an RGB representation will be used in this description. If multiple points within one cell 231 carry chromaticity values, then their mean value or a value obtained by global smoothing (e.g., fitting a function similar to function h discussed below) may be applied as the chromaticity value of the cell. Alternatively, the multiple chromaticity values are left unchanged, the dominance criterion is assessed for each, and all outcomes of these assessments in the cell are merged into one.

The data source of the two maps may be the sensor 211 which, as noted, may be an RGB-D sensor. The sensor's 211 output may be (or be convertible into) point-cloud data items of the form $(X_i,Y_i,Z_i,R_i,G_i,B_i)$, where the three pixel intensity components are separate, or of the form $(X_i,Y_i,Z_i, RGB_i)$, where the pixel intensity components are concatenated into one binary value. Then, starting from a tuple of this form, the second step 120 may include:

- a discretization operation, in which the horizontal coordinates $(X_i,Y_i)$ are converted (rounded) to grid coordinates (x,y),
- an elevation extraction, in which the elevation $Z_i$ is associated with the cell at grid coordinates (x,y), and
- a chromaticity extraction, in which the chromaticity data $(R_i,G_i,B_i)$ or $RGB_i$ is associated with the cell at grid coordinates (x,y).

The elevation extraction may optionally include a preprocessing operation 130, which eliminates point-cloud points located in remote regions compared to the sensor and/or physically unattainable points. The remote regions in this sense, which may be poorly visible from the sensor 211, may correspond to such points $(X_i,Y_i,Z_i)$ which satisfy a criterion $$C1: |(X_i,Y_i)-(X_a,Y_a)| \geq d_1$$

where $|\bullet|$ denotes Euclidean distance, $(X_a,Y_a,Z_a)$ is the position of the sensor 211 and $d_1$ is a constant (cutoff point). The constant $d_1$ is dependent on the sensor hardware and the degree of difficulty of the navigable environment; it may for example be of the order of tens of meters in an indoor use case. While the above expression refers to the two-dimensional distance (i.e., measured parallel to the substrate 220), variations of criterion C1 may refer to a three-dimensional distance. Examples of physically unattainable points $(X_i,Y_i, Z_i)$, to be removed in the preprocessing operation, are those for which $Z_i < Z_{min}$, which may be due to sensor artefacts.

The preprocessing operation 130 may further include eliminating point-cloud points which represent outlier values of the elevation. The fact that an elevation value differs significantly from other observations may suggest its correctness is doubtful, and it may thus be considered to be an outlier. Again, reference is made to the software routines available from The Point Cloud Library (https://pointcloud-s.org).

The chromaticity extraction may optionally include an intensity normalization, in which a pixel intensity triplet (R,G,B) is mapped to a pair (r,g) such that $$r = \frac{R}{R+G+B}, \, g = \frac{G}{R+G+B}.$$

Figure 4:
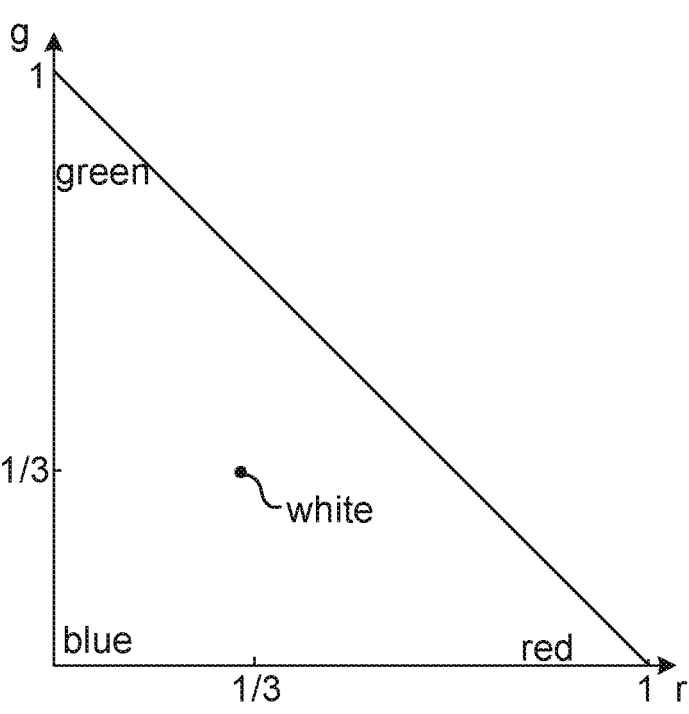
FIG. 4 illustrates a two-dimensional color space parametrized, in accordance with a color model, by normalized (intensity-normalized) green and red components of pixel intensity values.

Each of R,G,B may be a number in the range [0,255] which is in a linear relationship with the corresponding intensity of that color component. FIG. 4 is a graphical representation of the resulting two-dimensional color space. Reference colors green, blue and red have been indicated alongside with white, which corresponds to a flat spectrum where R=G=B. The intensity normalization may help eliminate measurement artefacts related to uneven illumination of different regions of the substrate 220.

In a fourth step 140, a mean elevation $Z_{ave}(x,y)$ of each cell is computed and a first partial occupancy probability $p_1$ is derived. The execution of the fourth step 140 may be restricted to such cells 231 of the occupancy grid 230 for which the elevation map contains elevation data. The mean elevation may be computed as follows:

$$Z_{ave}(x, y) = \frac{1}{N(x, y)} \sum_{(X_i,Y_i,Z_i) \sim (x,y)} Z_i$$

where N(x,y) is the number of sensor values $(X_i,Y_i,Z_i)$ falling in the grid cell at (x,y). An alternative way of computing the mean elevation uses a function h such that the surface $\varepsilon = \{(X,Y,Z):Z=h(X,Y)\}$ approximates the point-cloud data $\{(X_i,Y_i,Z_i)\}$. Here, the function h may have a predetermined smoothness (e.g., n times continuously differentiable), which is defined on the substrate 220 and fitted to the point-cloud data in such manner that said surface constitutes an $L^q$ approximation for some $q \geq 0$ or is 'close' to the point-cloud data in another suitable sense. The mean elevation is obtained by sampling the surface $\varepsilon$ at each grid cell, as follows:

$$Z_{ave}(x,y)=h(x,y).$$

This alternative way of computing the mean elevation may make the data accuracy more uniform, as it reduces the random impact of the rounding/quantizing into grid cells of the sensor data.

From the mean elevation, the first partial probability may be computed as follows:

$$p_1(x, y) = \frac{Z_{ave}(x, y)}{Z_{max}}$$

where $Z_{max}$ is a maximum height value. The maximum height $Z_{max}$ may be equal to the height at which the sensor 211 is arranged, as this may correspond to the height of the tallest objects that are visible to the sensor 211 without obscuration. Alternatively, the maximum height $Z_{max}$ is set to a value corresponding to what is, for other reasons, considered to be the height of the tallest physical object on the substrate 220 that can be reliably discovered by the sensor 211 in normal operating conditions.

A subsequent step 150 of the method 100 comprises multiple substeps 152, 154 where the chromaticity data is processed with the ultimate aim of determining a second partial occupancy probability $p_2$ for at least some cells 231 of the occupancy grid 230.

Figure 5:
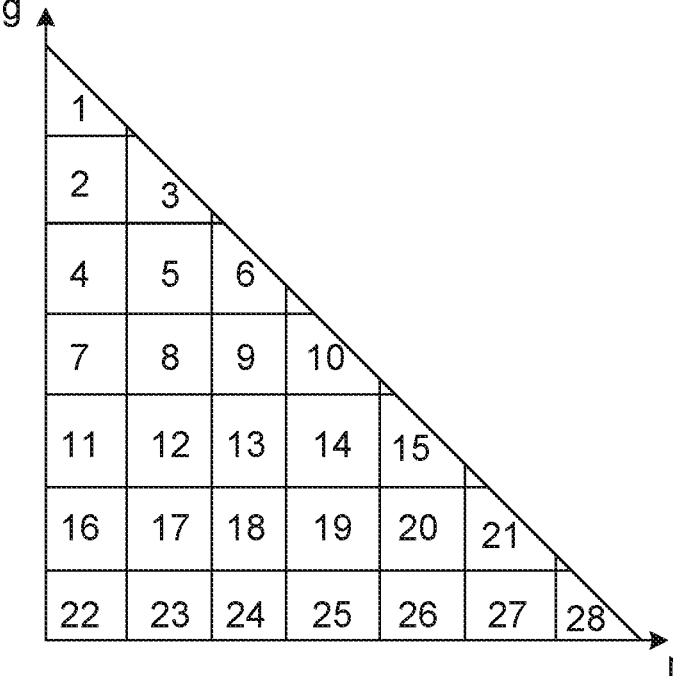
FIGS. 5 and 6 illustrate example partitions into numbered bins of the color space of FIG. 4.
Figure 6:
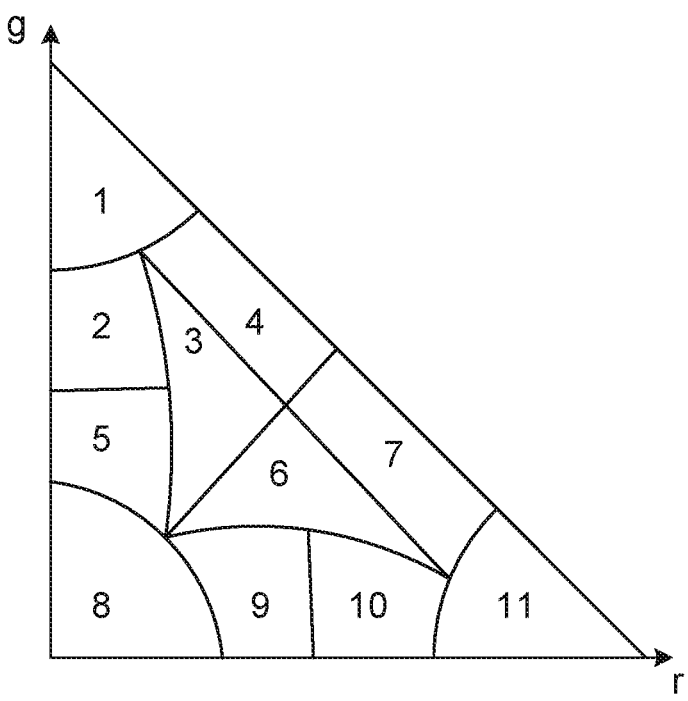

In a first substep 152, the distribution of the chromaticity is estimated to identify dominant chromaticity values. The estimation may include forming a histogram with respect to a set of predefined bins or color categories. FIG. 5 shows an example partition (mesh) of the (r,g) color space into squares of approximately uniform size, which have been numbered sequentially or have been provided with other identifiers. The definition of the partition is equivalent to a function $C(r,g)$ which maps a pair of normalized pixel intensity values (r,g) to a sequential number of the bin. FIG. 6 shows an alternative partition reflecting the fact that the perceived chromaticity varies relatively slower in the vicinity of the corners (0,0), (1,0), (0,1) and therefore can be reliably captured by a smaller number of bins.

Figure 7:
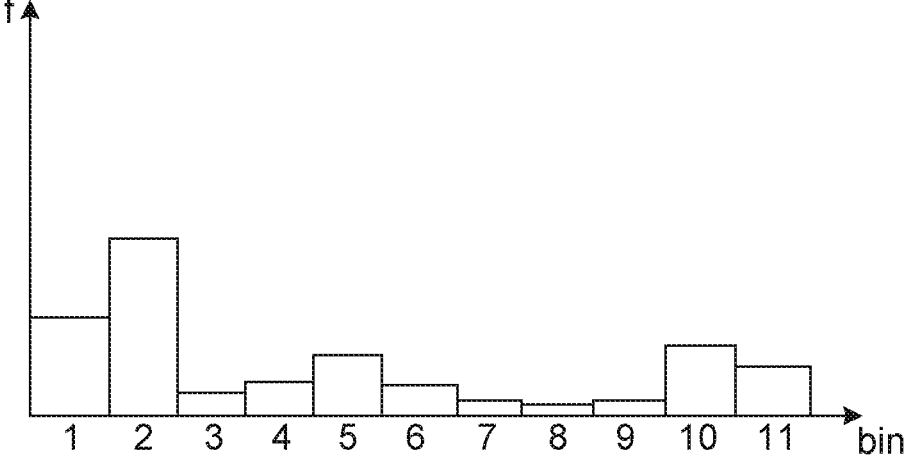
FIG. 7 is a histogram, with reference to the partition according to FIG. 6, of an example chromaticity map.

The partition illustrated in FIG. 5 and to some extent the one in FIG. 6 may be said to represent world-agnostic partitions, more precisely, in the sense that the density of bins is approximately uniform over the color space. In a use case where it is known or expected that certain chromaticity values are absent or very unusual, such a priori knowledge may be utilized to fashion a color space partition with locally reduced and/or locally increased density. FIG. 7 shows a histogram referring to the eleven-bin partition of FIG. 6 for an example chromaticity map. The vertical axis represents a frequency f of chromaticity of the respective bins. The frequency f may be an incidence, such as a number or normalized number of observations falling in each of the bins. For example, one may define $$f(c) = Card\{i : C(r_i, g_i) = c\}, 1 \leq c \leq c_{max},$$

where Card denotes the number of elements in the set and $c_{max}$ is the number of bins (here: 11).

As an alternative to using a histogram, the first substep 152 may start from a parameterization of a probability density function (ansatz) and vary its parameters so that it matches the sensor data.

In the histogram plotted in FIG. 7, the dominant chromaticity values correspond to those of bin 2. A second tier of dominant chromaticity values may include bins 1 and 10.

A second substep 154 makes use of the knowledge gained from the distribution of the chromaticity, as may be visualized in the form of a histogram. As explained, the inventor has realized that a cell-wise chromaticity value which is equal or close to a dominant chromaticity value (referring to the chromaticity map globally) and occurs in the same grid cell as a non-significant elevation value may suggest that the cell is non-occupied, i.e., free from physical objects. Therefore, for a cell at grid coordinates (x,y) which is associated with chromaticity (r,g)=(r(x,y), g(x,y)), the second partial occupancy probability may be assigned as per $$p_2(x, y) = 1 - \frac{f(C(r, g))}{\max_c f(c)}$$

Here, the relative dominance of the chromaticity bin, to which the cell belongs, is quantized as a fraction of the most populated chromaticity bin. If the chromaticity value belongs to the most populated (dominant) bin, then $p_2(x,y)$ =0. Alternate definitions of $p_2$ include $$p_2'(x, y) = 1 - k\frac{f(C(r, g))}{\max_c f(c)}$$

for some constant $0 < k < 1$, and $$p_2''(x, y) = 1 - \frac{f(C(r, g)) - \min_c f(c)}{\max_c f(c) - \min_c f(c)}$$

In a next step 160, the first and second partial occupancy probabilities $p_1(x,y)$ and $p_2(x,y)$ for a cell at grid coordinates (x,y) are merged to obtain an occupancy probability p(x,y) to be assigned to the cell in the occupancy grid 230. The first and second partial occupancy probabilities may be combined linearly or nonlinearly. One may for example set $$p(x, y) = \frac{\alpha_1 p_1(x, y) + \alpha_2 p_2(x, y)}{\alpha_1 + \alpha_2}$$

where coefficients $\alpha_1$, $\alpha_2 > 0$ are equal or different. Suitable coefficient values may be determined by empirical evaluation, wherein an initial guess may reflect the expected data quality of the elevation map and the chromaticity map, or its value as guidance for judging whether a physical object is present in the cell.

The fact that each one of the two partial occupancy probabilities contributes reflects the inventor's realization that the combination of a dominant chromaticity value and a low elevation is significant to suggest that a cell is likely free, i.e., that a low occupancy probability is to be assigned. It is recalled from the example of FIG. 2 that the puddle of liquid 241 has a color different than the substrate 220, which taken alone suggests that it is an obstacle, but at the same time a negligible elevation $h_{241} \approx 0$, which will tend to disqualify it as an obstacle.

In some embodiments, the first and second partial occupancy probabilities $p_1(x,y)$ and $p_2(x,y)$ are further merged with a pre-existing occupancy probability $p_{old}(x,y)$ of the cell. For this purpose, a recursive rule, as Bayes' rule, may be applied. The merging may proceed as follows:

$$p_{merged}(x, y) = \frac{p_{old}(x, y)p(x, y)}{p_{old}(x, y)p(x, y) + [1 - p_{old}(x, y)][1 - p(x, y)]}.$$

As a final step 170 of the method 100, the robot controller 300 may control movement of the industrial robot 310 on the basis of the occupancy grid. Such controlling may include local motion planning, tactical route planning, collision avoidance, speed regulation and similar tasks.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of controlling an industrial robot, which is movable on a substrate, comprising:

initializing an occupancy grid of cells which each represents a portion of the substrate and is associated with an occupancy probability that some physical object is present in the cell;

obtaining an elevation map and a chromaticity map of the substrate;

computing, on the basis of the elevation map, a mean elevation of each cell and deriving a first partial occupancy probability, wherein a higher first partial occupancy probability corresponds to a greater mean elevation;

on the basis of the chromaticity map, estimating a distribution of the chromaticity, identifying dominant chromaticity values, and computing, on the basis of a chromaticity of each cell, a second partial occupancy probability, wherein a lower second partial occupancy probability is assigned to the cell if its chromaticity is one of the dominant chromaticity values;

merging, for each cell, the first and second partial occupancy probabilities into an occupancy probability for the cell; and controlling the industrial robot on the basis of the occupancy grid.

2. The method of claim 1, wherein the elevation map and chromaticity map are obtained from an RGB-D sensor.

3. The method of claim 1, further comprising, prior to the computation of the mean elevation, eliminating outlier values of the elevation and/or physically unattainable values of the elevation and/or values of the elevation for remote regions of the substrate.

4. The method of claim 1, wherein said estimating a distribution of the chromaticity includes forming a histogram with predefined bins.

5. The method of claim 1, wherein the chromaticity map comprises values in two-dimensional chromaticity space obtained by normalizing triplets of pixel intensity values.

6. The method of claim 1, wherein the merging of the first and second partial occupancy probabilities includes computing a weighted average.

7. The method of claim 1, wherein the merging further comprises merging, for each cell, the first and second partial occupancy probabilities with a pre-existing occupancy probability of the cell.

8. A robot controller configured to control at least one industrial robot, which is movable on a substrate, the robot controller comprising:

an input interface for receiving data representative of an elevation map and a chromaticity map of the substrate from at least one sensor;

processing circuitry configured to perform the steps of:

initializing an occupancy grid of cells which each represents a portion of the substrate and is associated with an occupancy probability that some physical object is present in the cell;

obtaining the elevation map and the chromaticity map of the substrate;

computing, on the basis of the elevation map, a mean elevation of each cell and deriving a first partial occupancy probability, wherein a higher first partial occupancy probability corresponds to a greater mean elevation;

on the basis of the chromaticity map, estimating a distribution of the chromaticity, identifying dominant chromaticity values, and computing, on the basis of a chromaticity of each cell, a second partial occupancy probability, wherein a lower second partial occupancy probability is assigned to the cell if its chromaticity is one of the dominant chromaticity values;

merging, for each cell, the first and second partial occupancy probabilities into an occupancy probability for the cell; and controlling the industrial robot on the basis of the occupancy grid; and an output interface for supplying commands to the industrial robot.

9. A computer program product comprising a non-transitory data carrier storing a computer program, which includes instructions for causing a robot controller to perform a method, the robot controller being configured to control at least one industrial robot, which is movable on a substrate, the method including the steps of:

initializing an occupancy grid of cells which each represents a portion of the substrate and is associated with an occupancy probability that some physical object is present in the cell;

obtaining an elevation map and a chromaticity map of the substrate;

computing, on the basis of the elevation map, a mean elevation of each cell and deriving a first partial occupancy probability, wherein a higher first partial occupancy probability corresponds to a greater mean elevation;

on the basis of the chromaticity map, estimating a distribution of the chromaticity, identifying dominant chromaticity values, and computing, on the basis of a chromaticity of each cell, a second partial occupancy probability, wherein a lower second partial occupancy probability is assigned to the cell if its chromaticity is one of the dominant chromaticity values;

merging, for each cell, the first and second partial occupancy probabilities into an occupancy probability for the cell; and controlling the industrial robot on the basis of the occupancy grid.

10. The method of claim 2, further comprising, prior to the computation of the mean elevation, eliminating outlier values of the elevation and/or physically unattainable values of the elevation and/or values of the elevation for remote regions of the substrate.

11. The method of claim 2, wherein said estimating a distribution of the chromaticity includes forming a histogram with predefined bins.

12. The method of claim 2, wherein the chromaticity map comprises values in two-dimensional chromaticity space obtained by normalizing triplets of pixel intensity values.

13. The method of claim 2, wherein the merging of the first and second partial occupancy probabilities includes computing a weighted average.

14. The method of claim 2, wherein the merging further comprises merging, for each cell, the first and second partial occupancy probabilities with a pre-existing occupancy probability of the cell.

* * * * *